United States Patent
Bohling et al.

(10) Patent No.: US 10,889,731 B2
(45) Date of Patent: Jan. 12, 2021

(54) DURABLE AQUEOUS COMPOSITIONS FOR USE IN MAKING TRAFFIC MARKINGS HAVING GOOD DIRT PICKUP RESISTANCE AND TRAFFIC MARKINGS MADE THEREWITH

(71) Applicant: Rohm and Haas Company, Collegeville, PA (US)

(72) Inventors: James C. Bohling, Lansdale, PA (US); Joy A. Gallagher, Eagleville, PA (US); Eric C. Greyson, Blue Bell, PA (US); Mary Anne R. Matthews, Willow Grove, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 16/084,999

(22) PCT Filed: Mar. 24, 2017

(86) PCT No.: PCT/US2017/024034
§ 371 (c)(1),
(2) Date: Sep. 14, 2018

(87) PCT Pub. No.: WO2017/172520
PCT Pub. Date: Oct. 5, 2017

(65) Prior Publication Data
US 2019/0077983 A1 Mar. 14, 2019

Related U.S. Application Data

(60) Provisional application No. 62/316,053, filed on Mar. 31, 2016.

(51) Int. Cl.
C09D 133/08 (2006.01)
C09D 133/06 (2006.01)
C09D 5/02 (2006.01)
E01F 9/576 (2016.01)
C08K 5/544 (2006.01)
C08L 79/02 (2006.01)

(52) U.S. Cl.
CPC ............. *C09D 133/08* (2013.01); *C09D 5/02* (2013.01); *C09D 5/028* (2013.01); *C09D 133/06* (2013.01); *E01F 9/576* (2016.02); *C08K 5/544* (2013.01); *C08L 79/02* (2013.01)

(58) Field of Classification Search
CPC ........ C09D 5/02; C09D 5/028; C09D 133/06; C09D 133/08
See application file for complete search history.

(56) References Cited

U.S. PATENT DOCUMENTS

| | | | |
|---|---|---|---|
| 4,119,600 A | 10/1978 | Bakule et al. | |
| 4,325,865 A | 4/1982 | Baer | |
| 4,654,397 A | 3/1987 | Mueller-Mall et al. | |
| 4,814,373 A | 3/1989 | Frankel et al. | |
| 5,340,870 A | 8/1994 | Clinnin et al. | |
| 5,672,379 A | 9/1997 | Schall et al. | |
| 5,705,560 A | 1/1998 | Takarabe et al. | |
| 5,804,627 A | 9/1998 | Landy et al. | |
| 5,824,734 A | 10/1998 | Yang | |
| 6,228,901 B1 | 5/2001 | Brown et al. | |
| 6,413,011 B1 | 7/2002 | Sobczak et al. | |
| 6,475,556 B1 | 11/2002 | Sobczak et al. | |
| 6,645,552 B1 | 11/2003 | Schall et al. | |
| 7,235,595 B2 | 6/2007 | Hermes et al. | |
| 2003/0194486 A1 | 10/2003 | Hermes et al. | |
| 2008/0075868 A1 | 3/2008 | Dombrowski | |
| 2011/0136936 A1 | 6/2011 | Hermes et al. | |

FOREIGN PATENT DOCUMENTS

| EP | 164699 B1 | 4/1997 |
|---|---|---|
| EP | 1505127 A1 | 2/2005 |
| EP | 1352931 | 3/2008 |

OTHER PUBLICATIONS

Brostow, W., Chiu, R., Kalogeras, I., Vassilikouw-Dov, A.; Prediction of Glass Transition Temperatures, Binary Blends and Copolymes; Materials Letters 62 (2008) pp. 3152-3155.
Meylan, W. M., Howard, P. H.; Atom/Fragment Contribution Method for Estimating Octanol-Water Partition Coefficients; American Chemical Society, Journal of Pharmaceutical Sciences/83, vol. 84, No. 1, Jan. 1995.
Chinese Office Action for the corresponding Chinese Application No. 201780021607.X; English translation; 6 pages.

*Primary Examiner* — Edward J Cain
(74) *Attorney, Agent, or Firm* — Andrew E. Merriam; Cantor Colburn LLP

(57) ABSTRACT

The present invention provides stable, quick drying aqueous compositions useful in making traffic markings having excellent low temperature flexibility which comprise (i) one or more vinyl or acrylic emulsion polymers chosen from single stage and multi-stage emulsion polymers, the polymer or at least one stage thereof having both a calculated glass transition temperature (calculated Tg) of from −25 to 0° C., and a calculated Hansch parameter of 1.4 to 2.25, and (iii) one or more fillers, extenders and/or pigments, wherein the composition has a percent pigment volume concentration (% PVC) of from 50 to 80% and, preferably, a volume solids of from 50 to 75%. The compositions may comprise one or more silanes, and one or more polyamines and a volatile base, such as ammonia.

16 Claims, No Drawings

DURABLE AQUEOUS COMPOSITIONS FOR USE IN MAKING TRAFFIC MARKINGS HAVING GOOD DIRT PICKUP RESISTANCE AND TRAFFIC MARKINGS MADE THEREWITH

The present invention relates to aqueous compositions useful for making traffic markings that comprise one or more vinyl or (meth)acrylic emulsion polymers having a Hansch parameter of from 1.4 to 2.25 determined via calculation, having a calculated glass transition temperature (Tg) of from −25 to 0° C., or, preferably, from −12 to 0° C., having a pigment volume concentration (% PVC) of from 40 to 80%, or, preferably, from 50 to 80% and having a volume solids from 50 to 75%, preferably from 55 to 70%. More particularly, it relates to such aqueous compositions comprising the one or more vinyl or acrylic emulsion polymers from methyl methacrylate, ethyl acrylate, butyl acrylate, acrylic acid, methacrylic acid and one or more pigments, such as a white or opacifier pigment, combined with one or more fillers and/or extenders.

Waterborne or aqueous traffic paint is an environmentally friendly and economical material for use in making roadways safer. Known aqueous traffic paint binders can provide both fast dry time and good paint stability. Aqueous traffic paints need flexibility to withstand damage under various environmental conditions; however, with flexibility comes a possible lack of dry time in certain compositions. Accordingly, there remains a need in the industry to develop a stable one component composition useful as an aqueous traffic paint having excellent low temperature flexibility and high humidity dry time.

European Patent no. EP764699(B1) to Rohm and Haas, discloses aqueous compositions for use in making wear resistance traffic markings that comprise an aminosilane, an aqueous evaporable carrier maintained at a pH in the range of from 7.5 to 11.0 and, dispersed therein, particles of a latex binder bearing an acid functional pendant moiety and an enamine functional pendant moiety, wherein the enamine functional pendant moiety results from the reaction of an acetoacetyl functional pendant moiety on the latex binder with ammonia or amine, the latex binder having a Tg in the range of from 0° C. to 60° C., a GPC number average molecular weight in the range varying from 1,000 to 1,000,000, and an acid number in the range varying from 0.1 to 390. Rohm and Haas does not disclose stable aqueous compositions that provide a traffic marking that exhibit the requisite good flexibility combined with dry time and stability. Further, Rohm and Haas specifically states that use of aminosilane in excess of 2 moles per mole of acetoacetyl functional pendant moieties results in increased and unacceptable water sensitivity; conversely, use of aminosilane in amounts of less than 0.1 moles per mole of acetoacetyl functional pendant moieties results in unacceptable wear resistance, water sensitivity and drying speed. See [0034].

Accordingly, the present inventors have sought to solve the problem of providing stable, one component aqueous compositions that enable one to provide traffic markings that are durable, flexible and exhibit good dry time.

SUMMARY OF THE INVENTION

1. In accordance with the present invention, aqueous compositions useful for making traffic markings comprise (i) from 5 to 30 wt. % as solids or, preferably, from 10 to 25 wt. % or, preferably from 12 to 20 wt. %, as solids, based on the total weight of the aqueous composition, of one or more vinyl or acrylic emulsion polymers chosen from single stage and multi-stage emulsion polymers, the polymer or at least one stage of the one or more multi-stage emulsion polymer having both a calculated glass transition temperature (Tg) of from −25 to 0° C., or, preferably, from −12 to 0° C., and a calculated Hansch parameter of from 1.4 to 2.25, or, preferably, 1.6 to 2.1 and (ii) one or more fillers, extenders and/or pigments, wherein the composition has a percent pigment volume concentration (% PVC) of from 40 to 80%, or, preferably, from 50 to 80%, or, preferably, from 55 to 75%. Preferably, the aqueous compositions may have a volume solids content of from 50 to 75%, preferably from 55 to 70%.

2. In accordance with the aqueous compositions of the present invention as in item 1, above, wherein the one or more vinyl or acrylic emulsion polymers or one or more stages thereof contain, in copolymerized form, from 40 to 100 wt. %, or, preferably, from 50 to 100 wt. % or, preferably, from 60 to 100 wt. % or, more preferably, from 70 to 100 wt. %, based on the total weight of monomer solids used to make the polymer, of one or more monomers which have a Hansch parameter of from 1.2 to 2.25, such as, for example, a $C_2$ to $C_4$ alkyl acrylate or a $C_1$ to $C_2$ alkyl methacrylate.

3. In accordance with the aqueous compositions of the present invention as in items 1 or 2, above, wherein the one or more vinyl or acrylic emulsion polymers or stages thereof contains, in copolymerized form, from 20 to 70 wt. %, or, preferably, from 30 to 60 wt. %, based on the total weight of monomer solids used to make the polymer, of one or more monomers which have a Hansch parameter of from 1.0 to 1.4, such as, for example, ethyl acrylate or methyl methacrylate 4. In accordance with the aqueous compositions of the present invention as in any one of items 1, 2, or 3, above, wherein the one or more vinyl or acrylic emulsion polymers or stages thereof contains, in copolymerized form, less than 10 wt. %, based on the total weight of monomer solids used to make the polymer, of one or more monomers which have a Hansch parameter of 3.5 or greater, or preferably less than 10 wt. % based on the total weight of monomer solids used to make the polymer, of one or more monomers which have a Hansch parameter of 3.0 or greater, or, preferably, less than 10 wt. %, based on the total weight of monomer solids used to make the polymer, of one or more monomers which have a Hansch parameter of 2.5 or greater.

5. In accordance with the aqueous compositions of the present invention as in any one of items 1, 2, 3 or 4, above, wherein the one or more vinyl or acrylic emulsion polymers or stages thereof contains, in copolymerized form, from 0 to 10 wt. %, or, preferably, from 0.1 to 5.0 wt. %, or, more preferably, from 0.5 to 2.5 wt. %, based on the total weight of monomer solids used to make the polymer, of one or more monomers which have a Hansch parameter of less than 1.1 such as, for example, ethylenically unsaturated carboxylic acid monomers, like (meth)acrylic acid or its salts, ethylenically unsaturated amide monomers, such as acrylamide, phosphorus acid group containing vinyl or acrylic monomers, such as phosphoethyl methacrylate, or sulfur acid group containing vinyl or acrylic monomers, such as methacrylamidopropane sulfonic acid or its salts.

6. In accordance with the aqueous compositions of the present invention, as in any one of items 1, 2, 3, 4 or 5, above, wherein the one or more emulsion polymers is chosen from a multi-stage emulsion polymer wherein at least one stage has a calculated Hansch parameter of from 1.4 to 2.25 comprises from 10 to 90 wt. %, or, preferably, from 20 to 90 wt. %, or, more preferably, from 50 to 90 wt. %, as solids, of the multi-stage emulsion polymer.

7. The aqueous compositions in accordance with the present invention in any one of items 1-6, above, wherein the one or more vinyl or acrylic emulsion polymers or stages thereof is an acrylic emulsion polymer comprising, in copolymerized form, from 25 to 100 wt. %, or, preferably, from 60 to 99.5 wt. %, or, preferably, from 80 to 99.5 wt. % based on the total weight of monomers used to make the polymer, of a) a combination of two or more monomers chosen from methyl methacrylate, ethyl acrylate, butyl acrylate, methyl acrylate, sec-butyl acrylate, t-butyl acrylate, methacrylic acid, acrylic acid or iso-butyl acrylate, or b) one or more monomers chosen from ethyl acrylate, sec-butyl acrylate, or iso-butyl acrylate, the acrylic emulsion polymer having a calculated glass transition temperature of from −25 to 0° C., or, preferably, from −12 to 0° C.

8. The aqueous compositions in accordance with the present invention in any one of items 1, 2, 3, 4, 5, 6 or 7, above, wherein the (ii) one or more fillers, extenders and/or pigments comprises, a pigment, such as a white or opacifier pigment, preferably, titanium dioxide, combined with one or more fillers and/or extenders, preferably calcium carbonate, calcium oxide, silica, silicates, and combinations thereof.

9. The aqueous compositions in accordance with the present invention in any one of items 1, 2, 3, 4, 5, 6, 7 or 8, above, further comprising one or more silanes, for example, alkoxysilanes, vinyl alkoxysilanes, amino alkoxy silanes, diamino alkoxy silanes or epoxy alkoxy silanes, preferably, amino alkoxy silanes or diamino alkoxy silanes.

10. The aqueous compositions in accordance with the present invention as in any one or items 1, 2, 3, 4, 5, 6, 7, 8 or 9, wherein the (i) one or more vinyl or acrylic emulsion polymers is an anionically stabilized emulsion polymer and the composition further comprises one or more polyamine and one or more volatile base, such as an alkyl amine, an amine alcohol such as 2-amino-2-methyl-1-propanol or, preferably, ammonia.

11. The aqueous compositions in accordance with the present invention as in item 10, above, wherein the amount of the one or more polyamine ranges from 0.1 to 10 wt. % or, preferably, from 0.2 to 5.0 wt. % solids based on total polymer solids.

12. The aqueous compositions in accordance with the present invention as in any of items 10 or 11, above, wherein the composition has a pH of 7.0 to 11, or, preferably, 9.0 to 11.

13. The aqueous compositions in accordance with the present invention as in any of 1, 2, 3, 4, 5, 6, 7, 8 or 9, above, wherein the compositions have a pH of 7.0 to 11, or, preferably, 9.0 to 11.

14. The aqueous compositions in accordance with the present invention as in any one of items 1 to 13, above, comprising a low volatile organic compound (VOC) level, such as 150 g/L or less, or, preferably, 100 g/L or less.

15. The aqueous compositions in accordance with the present invention as in any one of items 1 to 14, above, wherein the compositions are substantially free of acetoacetyl functional pendant moieties.

16. In accordance with another aspect of the present invention, methods of making traffic markings or other coated substrates comprising applying the aqueous compositions of any of 1 to 15, above, to (a) a road, paved or concrete surface and allowing it to dry to form a traffic marking, or to (b) a concrete surface or a building surface and allowing it to dry to form a coated substrate.

17. In accordance with yet another aspect of the present invention, coated substrates comprise the traffic markings or coated substrates formed by the methods of the present invention in item 16, above.

All ranges recited are inclusive and combinable. For example, a recitation of a % PVC of from 20 to 80%, or, preferably, from 40 to 75%, or, more preferably, 40% or more or up to 65% means any or all of a % PVC of from 20 to 80%, from 20 to 40%, from 20 to 65%, from 40 to 80%, from 75 to 80%, from 20 to 75%, from 65 to 80%, or, preferably, from 40 to 75%, or, preferably, from 65 to 75%, or, more preferably, from 40 to 65%.

Unless otherwise indicated, conditions of temperature and pressure are room temperature and standard pressure, also referred to herein as "ambient conditions".

The singular forms "a," "an," and "the" include plural referents unless the context clearly dictates otherwise.

All phrases comprising parentheses denote either or both of the included parenthetical matter and its absence. For example, the phrase "(meth)acrylate" includes, in the alternative, acrylate and methacrylate.

As used herein, the term "substantially free of acetoacetyl functional pendant moieties" means that the amount of monomers containing such moieties contained in the compositions, in copolymerized form, is less than 500 ppm, expressed as the total amount of monomers containing the acetoacetyl functional pendant moieties used to make emulsion polymers, based on the total solids of the composition.

As used herein, the term "acid monomer or anionic monomer" means ethylenically unsaturated carboxylic acid monomer in either the acid or anionic form ($COO^-$).

As used herein, the term "aqueous" means water or water mixed with up to 20 wt. %, or up to 12 wt. %, of a water miscible solvent which is volatile under ambient conditions, such as a lower alkanol.

As used herein, unless otherwise indicated, the term "calculated glass transition temperature" or "calculated Tg" refers to the Tg of a polymer calculated by using the Fox equation (T. G. Fox, Bull. Am. Physics Soc., Volume 1, Issue No. 3, page 123 (1956)). For example, to calculate a Tg of a copolymer of monomers M1 and M2, $1/Tg=w(M1)/Tg(M1)+w(M2)/Tg(M2)$, wherein w(M1) is the weight fraction of monomer M1 in the copolymer, w(M2) is the weight fraction of monomer M2 in the copolymer, Tg(M1) is a published glass transition temperature ("Fox Tg") of a high molecular weight homopolymer (>50 k weight average) of M1, Tg(M2) is a published glass transition temperature of a high molecular weight homopolymer of M2, and all temperatures are in Kelvin. Various literature sources yield small disagreements in Fox Tg, but Table 1 provides values used for this application for several monomers.

As used herein, unless otherwise indicated, the term "emulsion polymer" refers to a polymer made by aqueous emulsion polymerization.

TABLE 1

Constants of Monomers Useful in The Present Invention

| Monomer | Fox Tg (° C.) | Hansch Parameter |
| --- | --- | --- |
| Acrylic Acid | 105 | 0.44 |
| Methyl Acrylate | 10 | 0.73 |
| Ethyl Acrylate | −24 | 1.22 |
| Butyl Acrylate | −54 | 2.2 |
| 2-Ethylhexyl Acrylate[1] | −85 | 4.6 |
| iso-Butyl Acrylate | −24 | 2.13 |
| sec-Butyl Acrylate | −26 | 2.13 |

TABLE 1-continued

Constants of Monomers Useful in The Present Invention

| Monomer | Fox Tg (° C.) | Hansch Parameter |
| --- | --- | --- |
| tert-Butyl Acrylate | 43 | 2.09 |
| Methacrylic Acid | 228 | 0.99 |
| Methyl Methacylate | 105 | 1.28 |
| Ethyl methacrylate | 65 | 1.77 |
| Butyl Methacrylate | 20 | 2.75 |
| Cyclohexyl methacrylate | 92 | 3.54 |
| 2-Ethylhexyl Methacrylate | −10 | 4.64 |
| Styrene | 100 | 2.89 |

[1]2-ethylhexyl acrylate Tg value is not taken from Aldrich, St. Louis, MO.

For monomers not included in Table 1, above, suitable homopolymer Tg values can be found at https://www.sigmaaldrich.com/content/dam/sigma-aldrich/docs/Aldrich/General_Information/thermal_transitions_of_homopolymers.pdf.

As used herein, unless otherwise indicated, the phrase "measured glass transition temperature" or "measured Tg" refers to a Tg as determined by differential scanning calorimetry (DSC), including preheating the polymer to 120° C., rapidly cooling it to −100° C., and then heating to 150° C. at a heating rate of 20° C./minute while collecting data. The Tg recorded was the midpoint of the inflection using the half-height method.

As used herein, the term "ethylenically unsaturated carboxylic acid monomer" refers to acrylic acid, methacrylic acid, beta-acryloxypropionic acid, ethacrylic acid, α-chloroacrylic acid, α-vinylacrylic acid, crotonic acid, α-phenylacrylic acid, cinnamic acid, chlorocinnamic acid, β-styrylacrylic acid, maleic acid, itaconic acid, citraconic acid, and salts thereof.

As used herein, the term "calculated Hansch parameter" for any polymer, polymer stage, or mixture of two or more monomers refers to the weighted average of the calculated log octanol-water partition coefficient ("log Kow") of the constituent monomers of the polymer, stage or monomer mixture. The Hansch parameter represents an index of hydrophobicity, with higher values indicating greater hydrophobicity. Further, as used herein, the term "Hansch parameter" refers to the log Kow of a given monomer, as listed in Table 1, above. Otherwise, for monomers not listed in Table 1, the Hansch parameter or log Kow for the monomer can be calculated using a software tool called the EPI Suite™ tool. The United States Environmental Protection Agency provides the EPI Suite™ tool for use in applying a Kowwin methodology to calculate log Kow. See US EPA, (2016), Estimation Programs Interface Suite™ for Microsoft WINDOWS™, v 4.11, United States Environmental Protection Agency, Washington, DC, USA. The EPI Suite™ tool can be downloaded at http://www.epa.gov/tsca-screening-tools/epi-suitetm-estimation-program-interface. The Kowwin methodology uses a corrected "fragment constant" methodology to predict the Hansch parameter, expressed as log P. For any molecule, the molecular structure is divided into fragments, each fragment having a coefficient, and all coefficient values in the structure are summed together to yield the log P estimate for the molecule. Fragments can be atoms but are larger functional groups (e.g C═O) if the groups give a reproducible coefficient. The coefficients for each individual fragment used in the Kowwin methodology were derived by multiple regression of reliably measured log P values (KOWWIN's "reductionist" fragment constant methodology), wherein the log P was measured by testing the fragment in a mixture of water and a given hydrophobic organic solvent. In the corrected fragment constant methodology, the coefficients of groups were adjusted by a correction factor to account for any differences between a measured log P coefficient value of a group and a log P for the same group that would result from summing the estimated log P coefficients from all atoms in the group alone. The KOWWIN calculation tool and estimation methodology were developed at Syracuse Research Corporation. A journal article by Meylan and Howard (1995) describes the program methodology as the "Atom/fragment contribution method for estimating octanol-water partition coefficients." J. Pharm. Sci. 1995, 84, 83-92. The Hansch parameter values for some common individual monomers are listed above in Table 1, above, based on calculations from the EPI Suite™ tool. Any Hansch parameter values for monomers not listed in the table should be calculated using the EPI Suite™ tool, or may also be found in "Exploring QSAR: Volume 2: Hydrophobic, Electronic and Steric Constants", 1995, American Chemical Society, Washington, DC or can be determined experimentally in an octanol-water mixture by testing it and comparing it relative to one or more monomers having a known Hansch parameter for use as a standard.

As used herein, the term "calculated Hansch parameter" for a given mixture of more than one monomers (monomer mixture) refers to the weighted average by weight % of the Hansch parameter of each monomer in the composition. For example, to calculate the Hansch parameter of a mixture of 50 weight % styrene and 50 weight % 2-ethylhexyl acrylate, one would multiply the log Kow of each monomer by its weight fraction (50 weight % equates to a 0.5 weight fraction) and take their sum as the calculated Hansch parameter of the vinyl monomer composition: 2.89(0.5)+4.6(0.5) =3.75.

As used herein, the term "(meth)acrylate" means acrylate, methacrylate, and mixtures thereof and the term "(meth)acrylic" used herein means acrylic, methacrylic, and mixtures thereof.

As used herein, unless otherwise indicated, the phrase "molecular weight" refers to the weight average molecular weight as measured by gel permeation chromatography (GPC) against a poly(methylmethacrylate) or poly(styrene) standard, respectively, for an acrylic or a vinyl emulsion polymer, and against a poly(acrylic acid) for a polyamine.

As used herein, the term "pigment volume concentration" or % PVC refers to the quantity calculated by the following formula:

$$\%PVC = \frac{\left(\begin{array}{c}\text{volume of pigment(s)} + \\ \text{volume extender(s)} + \text{volume of filler(s)}\end{array}\right)}{\text{(Total dry volume of paint)}} \times 100$$

As used herein, the term "volume solids" of a wet paint refers to the quantity calculated by the following formula:

$$\%\text{Volume Solids} = \frac{\text{(volume of dry coating)}}{\text{(Total wet volume of paint)}} \times 100\%$$

As used herein, the term "vinyl or acrylic emulsion polymer" refers to a polymer made from one or more different monomers, such as a copolymer, a terpolymer, a tetrapolymer, a pentapolymer etc., or any of a random, block, graft, sequential or gradient polymer.

As used herein, the term "total polymer solids" or "polymer solids" means the total solids of the one or more vinyl or acrylic emulsion polymers and the polyurethanes or polyurethane prepolymers in the aqueous compositions.

As used herein, the term "solids" refers to any material that is not volatile at 100° C. Thus, the concept of solids excludes volatile solvents, water and ammonia.

As used herein, the term "road" includes any indoor or outdoor solid surface that is or may be constantly or intermittently traveled on by pedestrians, moving vehicles, tractors, or aircraft. Some non-limiting examples of a "road" include highways, streets, driveways, sidewalks, runways, taxiing areas, tarmac areas, and parking lots.

As used herein, the phrase "wt. %" stands for weight percent.

As used herein, unless otherwise indicated, the term "weight average particle size" means the particle size as determined by light scattering (LS) using a Brookhaven 90 Plus particle size analyzer (Brookhaven Instruments Corp., Holtsville, N.Y.).

The present inventors have found that the compositions of the present invention enable traffic paint compositions that can provide all of improved low temperature flexibility (tested via Mandrel bend test), paint stability (tested via heat age stability), and dry time (tested via no pick-up time and dry through under high humidity, low air flow conditions).

The aqueous compositions of the present invention have low total polymer solids proportions of from 5 wt. % to 30 wt. %, or, preferably, from 10 wt. % to 25 wt. %, or, preferably from 12 wt. % to 20 wt. %, all wt. % s based on the total weight of the wet formulation.

Suitable concentrations of fillers, extenders and/or pigments may range from 50 to 80 wt. % or, preferably, from 55 to 75 wt. %, or, preferably, from 60 to 65 wt. %, all wt. % s based on the total weight of a wet formulation.

The vinyl or acrylic emulsion polymers of the present invention may be prepared from at least 40 wt % and up to 100 wt. %, based on the total weight of monomer solids used to make the polymer, of one or more polymerizable ethylenically unsaturated monomers having an individual Hansch parameter of from 1.2 to 2.3 such as, for example, a $C_2$ to $C_4$ alkyl acrylate or a $C_1$ to $C_2$ alkyl methacrylate.

So long as the vinyl or acrylic emulsion polymers of the present invention have the calculated Tg and calculated Hansch parameter of the present invention, such emulsion polymers may be prepared from a wide range of suitable polymerizable ethylenically unsaturated monomers including those having an individual Hansch parameter of more than 2.3, such as, for example, nonionic ethylenically unsaturated monomers, including arylenes, such as styrene and α-methyl styrene; butadiene; olefins; vinyl esters; vinyl halides; vinylidene chloride; (meth)acrylonitrile; $C_4$-$C_{24}$ alkyl esters of (meth)acrylic acid; for example, n-butyl methacrylate, 2-ethylhexyl (meth)acrylate, and other (meth)acrylates.

Suitable polymerizable monomers for making the vinyl or acrylic emulsion polymers of the present invention may further include, in copolymerized form, from 0 to 10 wt. %, preferably, from 0 to 2 wt. %, based on the total weight of monomers used to make the polymer, of at least one multiethylenically unsaturated monomer. Examples of multiethylenically unsaturated monomers that may be used include allyl (meth)acrylates; glycol di(meth)acrylates; and aromatic di- and tri-vinyl monomers, such as, divinylbenzene, and divinyltoluene.

The vinyl or acrylic emulsion polymers of the present invention may further contain, in copolymerized form, monomers that have an individual Hansch parameter of less than 1.1, such as, for example, amide containing monomers, like (meth)acrylamide, or ionic ethylenically unsaturated monomers such as ethylenically unsaturated carboxylic acid monomers, such as (meth)acrylic acid, itaconic acid and maleic acid.

Preferably, the vinyl or acrylic emulsion polymers of the present invention comprise copolymerized ethylenically unsaturated carboxylic acid monomers. When such acid monomers are in their deprotonated form, as at a pH below the pKa of the acid monomers themselves, they can be referred to as anionic monomers.

Suitable levels of copolymerized ethylenically unsaturated carboxylic acid monomers in the vinyl or acrylic emulsion polymers of the present invention may range from 0 to 10 wt. %, preferably, 0.1 to 5 wt. %, and, more preferably, 0.5 to 2.5 wt. %, based on the total weight of monomer solids used to make the polymer.

Acid functional groups may also include multi-acid functional groups that are formed from ethylenically unsaturated monomers and that contain multiple acid groups. The multi-acid functional groups may be incorporated into the polymer particle, for example, by including as polymerized units, a terminally unsaturated multiacid macromonomer. The vinyl or acrylic emulsion polymers of the present invention may optionally have one or more acid functional groups from monomers, in copolymerized form, that have a an individual Hansch parameter of less than 1.1. Such monomers may include, for example, chosen from a phosphorus acid group, a sulfur acid group, salts thereof, and combinations thereof. The phosphorus acid-functional group may be a (di)hydrogen phosphate group, phosphonate group, phosphinate group, alkali metal salt thereof, other salt thereof, or a combination thereof. The vinyl or acrylic emulsion polymers may contain such acid functional groups in copolymerized form at levels ranging from 0.0 to 10 wt. %, preferably, up to 5 wt. %, and, more preferably, up to 3.5 wt. %, based on the weight of the monomer solids used to make the copolymer.

Suitable phosphorus acid group containing monomers may include, for example, (di)hydrogen phosphate esters of an alcohol containing a polymerizable vinyl or olefinic group, such as phosphates of hydroxyalkyl(meth)acrylates including hydroxyethyl (meth)acrylate. Other suitable such monomers may include, for example, phosphonate functional monomers, like vinyl phosphonic acid. Preferred phosphorus acid monomers include phosphoethyl (meth)acrylate.

A vinyl or acrylic emulsion polymer may also be functionalized post-polymerization to give acid functional groups. In such a case, the proportion of acid functional groups may be determined by titration to determine the number of acid functional groups in a given mass of polymer; and, the weight proportion of acid functional groups can then be determined by multiplying the number of acid groups by the mass of monomers converted to acid function groups in the polymer and dividing by the weight average molecular weight of the polymer.

Other suitable polymerizable monomers for making the vinyl or acrylic emulsion polymers of the present invention may include, for example, hydroxy-, amine-, epoxy-, and keto-functional monomers, autooxidizable monomers like acetoacetoxy group containing monomers, such as acetoacetoxyalkyl (meth)acrylates, and small amounts of adhesion-promoting monomers; as well as polymerizable surfactants, including, but not limited to, the monomers sold as Trem™ LF-40 (Henkel Corporation, King of Prussia, Pa.).

Still other suitable monomers include, for example, ethylenically-unsaturated acetoacetoxy group containing monomers may include acetoacetoxyethyl methacrylate, acetoacetoxyethyl acrylate, acetoacetoxypropyl methacrylate, allyl acetoacetate, acetoacetoxybutyl methacrylate, 2,3-di(acetoacetoxy)propyl methacrylate, or combinations thereof.

To limit the water sensitivity of the vinyl or acrylic emulsion polymers, the total amount of phosphorus acid, multi-acid, acid, hydroxyl, amine, ketone, aldehyde, aldol, keto-ester (acetoacetoxy), or aldimine group functional groups in or used to make the copolymer should not exceed 25 wt. %, or, alternatively, should not exceed 10 wt. %.

The vinyl or acrylic emulsion polymers useful in the aqueous compositions of the present invention may be prepared by conventional polymerization processes, including suspension or emulsion polymerization at known polymerization temperatures of from room temperature to about 92° C. which may be optimized for the catalyst system employed. The vinyl or acrylic emulsion polymers may have a unimodal or a multimodal, including a bimodal, particle size distribution.

Suitable emulsion polymerization techniques are well known in the polymer arts, and may include single stage processes and multiple stage polymerization processes. In the latter case, the first stage polymer can be prepared by various techniques, such as solution polymerization, bulk polymerization or emulsion polymerization. Preferably, emulsion polymerization is used.

The emulsion polymerization techniques used for preparing multi-stage polymer particles are well known in the art and are disclosed, for example, in the U.S. Pat. Nos. 4,325,856, 4,654,397 and 4,814,373.

Polymerization may be carried out using one or more water-soluble or water-insoluble polymerization initiator which thermally decompose(s) at the polymerization temperature to generate free radicals, such as, for example, persulfates, like ammonium or alkali metal (potassium, sodium, or lithium) persulfate.

Polymerization initiators may be used alone or as the oxidizing component of a redox system, which also includes a reducing component, such as, for example, ascorbic acid or sodium formaldehyde sulfoxylate. Examples of redox catalyst systems include t-butyl hydroperoxide/sodium formaldehyde sulfoxylate/Fe(II), and ammonium persulfate/sodium bisulfite/sodium hydrosulfite/Fe(II). The initiator and the optional reducing component may be used in proportions from 0.001% to 5% each, based on the weight of the ethylenically unsaturated monomers in the monomer mixture to be polymerized. Accelerators such as chloride and sulfate salts of cobalt, iron, nickel, or copper may be used in small amounts.

Chain transfer agents, such as mercaptans, polymercaptans, and polyhalogen compounds, including alkyl mercaptans such as n-dodecyl mercaptan, may be used to control the molecular weight of the polymers. Amounts of these may range from 0 to 10 wt. %, or, preferably from 0 to 2 wt. %, based on the total weight of the ethylenically unsaturated monomers used to prepare the vinyl or acrylic emulsion polymers.

Aggregation of the copolymers may be discouraged by including a stabilizing surfactant in the polymerization mixture in the polymerization vessel. Many examples of surfactants suitable for emulsion polymerization are given in *McCutcheon's Detergents and Emulsifiers* (MC Publishing Co., Glen Rock, N.J.), published annually. Other types of stabilizing agents such as protective colloids, may also be used. For example, methyl cellulose and hydroxyethyl cellulose may be included in the polymerization mixture.

The vinyl or acrylic emulsion polymers may be prepared as an aqueous dispersion or suspension with a solids level of from 20 to 70 wt. %, or, preferably in the range of from 30 to 60 wt. %. or, preferably from 45 to 60 wt. %.

Preferably, the one or more vinyl or acrylic emulsion polymers of the present invention include one or more anionically stabilized emulsion polymers. In such cases, the aqueous compositions may further comprise one or more polyamine, which can be part of the anionically stabilized emulsion polymer, and a volatile amine.

The negative charge on the anionically stabilized emulsion polymer particles can be obtained in any of several ways. Anionically stabilized emulsion polymers may contain functional groups that are anionic when deprotonated, may be stabilized by anionic surfactants during or after polymerization, or any combination of two of these can be used. Suitable functional groups that are anionic when deprotonated may include, for example, carboxylic acids, anhydrides, and aldehydes. Suitable surfactants for stabilizing anionically stabilized emulsion polymers may include, for example, anionic surfactants, such as, for example, alkali or ammonium alkyl sulfates and oxyethylated alkyl phenol sulfates, non-ionic surfactants, or mixtures of anionic and non-ionic surfactants.

Anionically stabilized emulsion polymers may contain, as polymerized functional groups that are anionic when deprotonated, up to 10 wt. %, for example, up to 5 wt. %, and, preferably, 0.1 wt. % or more, or, preferably, up to 3.0 wt. %, of one or more (ethylenically unsaturated carboxylic acid monomer, for example, carboxylic acid, carboxylic anhydride, phosphorus acid group containing monomers, sulfur containing acid monomers, and mixtures thereof.

The polyamine may be any of a polyfunctional amine polymer, such as a polyimine, an amine post functionalized emulsion polymer, a polyamine functional emulsion polymer with pendant amine-functional groups, and an emulsion polymer with pendant strong cationic groups, such as quaternary amine groups, and weak acid groups. The choice of polyamine is not critical as long as it is a polyamine polymer.

The polyamine may comprise an emulsion polymer which contains both acid and amine groups, in which case no separate polyfunctional amine is needed in the binder composition. For example, the anionically stabilized emulsion polymer can contain, as polymerized units, up to 10 wt. %, for example, up to 7.5 wt. %, and, preferably, 0.1 wt. % or more, or, preferably, up to 5.0 wt. % of amine-functional monomers.

Suitable polyamines may be obtained by known solution polymerization methods in aqueous media, either neutral, alkaline, or acidic, depending upon the particular polymer sought, for example, as taught in U.S. Pat. No. 4,119,600. Such polyamine polymers may include, for example, poly (oxazolidinylethyl methacrylate), poly(vinylamine), polyalkyleneimine, e.g. poly(ethyleneimine), and polymers containing pendant amine groups or strong cationic groups. Polymers prepared using imine monomers contain no imine functionality and, instead, contain amine functionality as part of the polymer backbone.

Suitable polyamine polymers may comprise emulsion polymers from, as polymerized units, two or more ethylenically unsaturated monomers comprising one or more amine containing monomers. The polyfunctional amines include copolymers with up to 80 wt. % of one or more nonionic ethylenically unsaturated monomer, such as any used to form the vinyl or acrylic emulsion polymer, preferably, (meth)acrylamide and methyl acrylate.

Examples of the amine containing monomers for making polyamine polymers include aminoalkyl vinyl ethers or sulfides; amine containing acrylamide or (meth)acrylic esters, such as dimethylaminoethyl (meth)acrylate; N-(meth)acryloxyalkyl-oxazolidines, such as poly(oxazolidinylethyl methacrylate), N-(meth)acryloxyalkyltetrahydro-1,3-oxazines, and monomers that readily generate amines by hydrolysis, as disclosed in U.S. Pat. No. 5,804,627. U.S. Pat. No. 5,672,379 discloses additional polyfunctional amines.

The amine or cationic functional groups pendent to a polyamine emulsion polymer may be introduced by post functionalizing the polymer with amines. For example, an emulsion polymer polymerized from monomers containing 1,3-dicarbonyl moieties, e.g. AAEM in the range of 0.5 wt. % to 20 wt. %, preferably up to 12 wt. %, can be reacted with polyamines which contain one and only one amine per molecule capable of reacting with 1,3-dicarbonyl compounds and at least one other amine which is incapable of reacting with 1,3-dicarbonyl compounds to form enamines all in weight percentages based on total weight of polymer solids.

Suitable amounts of the polyamine may range from 0.1 to 10 wt. %, based on the total weight of the anionically stabilized emulsion polymer, preferably 0.2 wt. % or more, or, preferably, 5.0 wt. % or less, and, more preferably, 0.5 wt. % or more or, more preferably, 2.0 wt. % or less.

The polyamine may be present in a composition, or it may be added as a separate component before, during or after the composition is applied to a substrate.

In the aqueous binder compositions, the type and amount of volatile base used is not critical so long as the base volatilizes in use conditions, e.g. under air drying conditions, and the amount is sufficient to raise the pH of an anionically stabilized emulsion polymer binder composition to the point where a desired proportion of the polyamine is in a non-ionic state (deprotonated) at all times prior to use. In the non-ionic state (i.e. deprotonated), polyfunctional amine interaction with the anionically stabilized emulsion and any other anionic ingredient which may be present in the composition is minimized Later, during film formation, the volatile base evaporates with the result that the amine moieties of the polyamine become protonated to form ammonium moieties which, in turn, interact with the anionic ingredients to destabilize the coating composition and thereby accelerate drying. Preferably, from 20 to 100 mole % of the amino groups of the polyamines may be deprotonated, more preferably from 60 to 100 mole %, even more preferably from 80 to 100 mole %, and most preferably from 90 to 100 mole %. Accordingly, suitable pH ranges for fast-drying aqueous dispersions may range from 7.5 to 11, preferably, 9 or higher, more preferably, from 9.5 to 10.7.

Suitable amounts of a volatile base may range from 0.2 to 5 wt. %, based on the total weight of the anionically stabilized emulsion polymer, and the polyfunctional amine. Suitable volatile bases may include any of ammonia, $C_1$-$C_6$ alkyl amines and $C_1$-$C_6$ alkanolamines, such as, for example, butylamine, propylamine, ethylamine, ethylenediamine, trimethyl amine, triethyl amine, diethylamine, diethanolamine, ethanolamine, 2-methylaminoethanol, 2-dimethylaminoethanol, morpholine, and N-methylmorpholine. Preferably, the volatile base is ammonia, or an admixture thereof with other volatile or nonvolatile bases.

The compositions of the present invention may further include one or more silanes, such as, e.g. oxysilanes, amino alkoxy silanes or epoxy alkoxy silanes.

Preferably, the one or more silanes comprises an amino silane or a diamino silane, or, more preferably a hydrolysable amino silane or diamino silane. Examples of such preferred silanes may include, for example, N-ethylaminopropyltrimethoxy silane, aminoethylaminopropylmethyldimethoxy silane, aminoethylaminopropyl trimethoxy silane, aminopropylmethyldimethoxy silane, aminopropyltrimethoxy silane, aminoethylaminoethylaminopropyltrimethoxy silane, N-methylaminopropyltrimethoxy silane, aminopropylmethyldimethoxy silane, aminopropyltriethoxysilane, 4-aminobutyltriethoxy silane, and various combinations thereof. These aminosilanes are available from suppliers such as Dow Corning, Midland, Mich., Momentive Performance Materials, Waterford, N.Y., Evonik Industries, Essen, Germany An Aminoethylaminopropyltrimethoxy silane sold under the tradename Dow Corning Z-6020 is one preferred example. Other suitable silanes may include, for example, oligomeric aminoalkylsilanes and polymeric aminoalkylsiloxanes.

The presence of silane surprisingly improves the quick-dry performance (tested via formulated dry time measured in lab) of the paints comprising polymers with calculated Fox Tgs in the range of the invention added at levels up to about 2% silane actives on polymer solids; further the presence of the silane without an enamine functional binder surprisingly does not render a water sensitive coating. Further, it has been found that use of fillers or extenders other than calcium carbonate can reduce this quick-dry performance improvement.

Suitable fillers or extenders (ii) for use in the aqueous compositions of the present invention may include, for example calcium carbonate, silicas, silicates, like dolomite or aluminum silicates, talcs, nepheline syenite, ceramics like calcium oxide, quartz(ite), glass or polymeric microspheres, cement, and silica sand. Calcium carbonate is preferred.

Suitable concentrations of fillers, extenders and/or pigments may range from 50 to 80 wt. % or, preferably, from 55 to 75 wt. %, or, preferably, from 60 to 65 wt. %, all wt. % s based on the total weight of the wet formulation Filler and extender amounts may comprise 25 to 80% PVC, or, preferably 50 to 80% PVC, or, most preferably 50 to 75% PVC. Silica may be used at 0 to 40% PVC, preferably 0 to 25% PVC; nepheline syenite or other aluminum silicates may be used 0 to 40% PVC, preferably 0 to 25% PVC. Calcium carbonate may be used at 0 to 80% PVC, preferably 50 to 80% PVC, most preferably 50-70% PVC.

Suitable pigments (ii) for use in the aqueous compositions of the present invention may include titanium dioxide, organic pigments, carbon black and iron oxides. Inorganic pigment amounts may range from 0 to 15% PVC, preferably, from 3 to 10% PVC.

Opaque polymers as pigments may be used at from 0 to 30% PVC, or, preferably to 0 to 15% PVC. Opaque polymers are considered pigment and not binder for % PVC calculations.

The aqueous compositions include water or water having dissolved therein a water miscible organic solvent, such as methanol, ethanol and glycol ether. Water or water containing ethanol or methanol are preferred.

The aqueous compositions of the present invention may contain additional ingredients, such as, for example, surfactants, dispersants, thickeners, such as polyvinyl alcohol (PVA), hydroxyethyl cellulose (HEC), associative thickeners, such as, for example, hydrophobically-modified, alkali soluble emulsions (HASE), hydrophobically-modified ethylene oxide-urethane polymers (HEUR), and hydrophobically-modified hydroxy ethyl cellulose (HMHEC), alkali-soluble or alkali-swellable emulsions (ASE), other cellulosic thickeners, and attapulgite clay; rheology modifiers; colorants; coalescents and plasticizers, such as, for example, Texanol™ 2,2,4-Trimethyl-1,3-pentanediol diisobutyrate, a coalescent (Eastman Chemicals, Kingsport, Tenn.) and Optifilm™ 400 coalescent (Eastman); crosslinking agents; tackifiers; dispersants; wetting agents; dyes; sequestering agents; preservatives, biocides and mildewcides; anti-freeze agents; slip additives; waxes; freeze/thaw protectors; defoamers; corrosion inhibitors; anti-flocculants; and ultraviolet light absorbers, such as benzophenone. HEC is the preferred thickener.

Suitable dispersants may include one or more non-ionic, or anionic dispersants, such as, for example, carboxylic acids, and anionic polymers such as homopolymers and copolymers based on polycarboxylic acids, including those that have been hydrophobically- or hydrophilically-modified, e.g. poly(meth)acrylic acid with various comonomers such as styrene, or alkyl(aryl) (meth)acrylate esters.

One or more surfactants may be used to stabilize the emulsion polymerization systems after polymerization of monomers and may be present at levels of from 0.1 to 8 wt. %, or, preferably from 0.1 to 3 wt %. based on the total weight of monomer in polymerization. Suitable surfactants include cationic, anionic, and non-ionic surfactants.

If the aqueous compositions of the present invention comprise one or more anionically stabilized emulsion polymers, care must be exercised when selecting the type and amount of additives to avoid altering the pH of the composition to an extent that interferes with storage stability or buffering the pH to an extent that after application the pH does not fall sufficiently to initiate protonation of the polyamine.

Preferably, to reduce cure time—During application of the aqueous traffic paint of the present invention to the surface of the substrate, "absorbers" may be added as a separate component applied to the surface in a separate step simultaneously with, before, or after the step of application of the aqueous coating composition. As used herein the term "absorber" refers to the general class of material that includes hollow sphere polymer, ion exchange resin beads, absorbent inorganic compounds, such as talc, silica and Sumica gel, molecular sieves, non-porous carbonaceous materials, porous carbonaceous materials, and superabsorbent polymer. These absorbers are capable of further increasing the drying rate of the aqueous traffic paint of the present invention. Such absorbers are known in the art, for example in U.S. Pat. Nos. 6,413,011, 6,475,556, and 6,645,552.

The aqueous compositions of the present invention may be used in traffic paints, and EIFS systems. The compositions may also be used in architectural and industrial coatings where fast dry time is required, like roof coatings or other exterior coatings. Various applications methods are known in the art, including spraying the composition on the road surface using pressurized spray guns, such as, for example truck mounted spray guns supplied with paint via air pressurized tanks or airless pumps. Other methods include applying the composition by hand using a paint brush or a paint roller. Coatings may be applied in one or more layer; further, the coatings may include one or two layers of absorber or absorber containing layers. Preferably, the substrate is cleaned prior to application to remove any dirt or sediments. Whether it comprises one layer or more than one layer, a suitable thickness of the dried film generally ranges from 100 µm to 2000 µm, preferably 200 to 1500 µm, and, preferably, up to 800 µm.

The compositions are suitable for coating or forming films on substrates such, as, for example, roads, and traffic control devices such as guardrails and concrete barriers, roof tops, walls, for example, in exterior insulation finishing systems (EIFS), walkways, runways, parking areas, and indoor floors (such as in factories or shopping malls). Typical building substrates include, for example, masonry, tar, asphalt, resin, concrete, cement, stone, stucco, tile, polymeric materials, metals, such as aluminum, stainless steel, or carbon steel, and combinations thereof. All of the substrates may already have one or more layers of an existing coating or paint which may be fresh or aged.

To improve the visibility of the roadway markings, the methods of the present invention may further include applying glass beads on the layer of the traffic paint or coating while the layer is still wet or by premixing them into the traffic paint prior to application. The glass beads may be applied by known methods, such as, for example, by spraying the glass beads entrained in and conveyed by a jet of air atop the traffic paint layer. The amount of glass beads applied on the coating layer may range from 200-1000 g/m$^2$, or, preferably 250-700 g/m$^2$ of the coating layer for visibility at night. Suitable glass beads for roadway markings may have an average particle size ranging from 50 to 2500 µm, preferably 150 µm or more, and, preferably, up to 1800 µm.

EXAMPLES

The following examples illustrate the present invention.
The following materials were used in the Examples:
Texanol™, 2,2,4-Trimethyl-1,3-pentanediol diisobutyrate, a coalescent (Eastman Chemicals, Kingsport, Tenn.);
Rhodoline™ 226/35 is a water soluble anionic dispersant (Solvay, Brussels, Belgium) at 35 wt. % solids;
Ti-Pure™ R-900 titanium dioxide (Chemours, Wilmington, Del.);
Drewplus™ L-493 defoamer (Ashland Inc., Covington, Ky.);
Surfynol™ CT-136 surfactant (Air Products and Chemicals, Inc., Allentown, Pa.);
Omyacarb™ 5 calcium carbonate (Omya, Oftringen, CH);
Cellosize™ ER-52M hydroxyethyl cellulose (The Dow Chemical Company, Midland, Mich.);
Silane A (100% active), Aminoethylaminopropylmethyldimethoxysilane;
p(OXEMA) is poly(oxazolidinoethylmethacrylate) at 27.0 wt. % solids;
Surfactant-A=ethoxylated $C_6$-$C_{18}$ alkyl ether sulfate having 1 to 15 EO groups per molecule (30 wt. % active in water); and,
Ammonia is 28 wt. % aqueous ammonia.
Abbreviations used in the Examples include: BA=butyl acrylate; MMA=methyl methacrylate; MAA=methacrylic acid; nDDM=n-dodecyl mercaptan; EHA=2-ethylhexyl acrylate; STY=styrene; BMA=butyl methacrylate Synthesis Examples: Aqueous dispersions containing polymer particles were prepared in a 5 liter, four-necked, round bottom flask equipped with a paddle stirrer, a thermometer, a nitrogen inlet and a reflux condenser.

Abbreviations Used in the Following Examples Include

Synthesis Example Comparative 1

To the flask was added 752.0 g of deionized (DI) water which was heated to 90° C. under nitrogen atmosphere. A solution of 4.0 g ammonium bicarbonate dissolved in 40.0 g of DI water was added to the reaction flask, followed by 6.5 g ammonium persulfate dissolved in 50.0 g of DI water and followed by 141.5 g of polymer seed latex (solids content were 42 wt. %, average particle diameter 60 nm) followed by 25.0 g of DI water to form a reaction mixture. A monomer emulsion was prepared by mixing 353.8 g DI water, 30.0 g Surfactant-A, 810.0 g BA, 1160.0 g MMA, 30.0 g MAA and 25.0 g n-DDM. The monomer emulsion was added to the flask contents over 80 minutes with the concurrent, but separate addition of a solution of 3.5 g ammonium persulfate dissolved in 250.0 g of DI water while maintaining the contents of the flask at a temperature of 88° C.

At the end of the polymerization, 0.01 g $FeSO_4$ in 11.5 g of DI water, 0.01 g of tetrasodium salt of ethylenediamine tetraacetic acid were added along with 3.0 g t-butylhydroperoxide (70% active) in 28.0 g DI water, and 1.5 g isoascorbic acid in 30.0 g of DI water. Ammonium hydroxide (30 wt. % active in water, 59.3 g) was added to adjust pH to 10.1. Post-polymerization, 96.2 g polyfunctional amine (p(OX-EMA), 27.5 wt. % active in water, was added to the reaction product. The final emulsion polymer resulted in a weight average particle diameter of 189 nm and solids content of 51 wt. %.

Synthesis of Inventive Emulsion Copolymers A and B and Comparative Emulsion Copolymers C-1 to C-9:

All emulsion polymers were prepared in the manner of Example Comparative 1, using the monomer mixtures indicated in Table 2, below. Table 2 also indicates the weight average particle diameters (nm), and the solids contents of the emulsion polymers used in the examples.

TABLE 2

Emulsion Polymer Characterization

| Emulsion Co-polymer | g EHA | g BA | g BMA | g MMA | g MAA | g Sty | PS (nm) | % Solids |
|---|---|---|---|---|---|---|---|---|
| C-1 | | 810 | | 1160 | 30 | | 221.6 | 51.5 |
| C-2 | | 1110 | | | 30 | 860 | 217.6 | 51.4 |
| C-3 | | 560 | 1410 | | 30 | | 193.5 | 51.5 |
| C-4 | 792 | | | | 30 | 1178 | 220.4 | 51.4 |
| C-5 | | 824 | | 1150 | 26 | | 200.0 | 50.5 |
| C-6 | | 990 | | 980 | 30 | | 193.3 | 51.7 |
| C-7 | | 1540 | | 430 | 30 | | 187.2 | 51.6 |
| C-8 | 1190 | | | 780 | 30 | | 187.3 | 51.8 |
| C-9 | 1180 | | | | 30 | 790 | 182.6 | 51.9 |
| INV-A | | 1126 | | 844 | 30 | | 195.0 | 51.0 |
| INV-B | | 1290 | | 680 | 30 | | 188.9 | 51.0 |

Aqueous traffic paint or coating compositions were prepared according to the formulations provided in Table 3 below. The ingredients were added in the indicated order to a plastic pail while stirring with an overhead mixer (RW28 mixer, IKA, Wilmington, N.C.). The ingredients of Part I were added sequentially under high shear agitation and then mixed for 15 minutes. The ingredients of Part II were then added sequentially, at an agitation speed necessary to maintain a deep vortex. Once all ingredients were added, the formulation was mixed for 15 minutes. Then, the formulation was let sit at least 24 hours before application. All compositions were made to have an equal weight percent of polymer solids on total wet paint weight by adjusting the amount of as is emulsion polymer and water in Part I as needed. (For example, if an emulsion polymers was 52.0 wt. % solids, then 16.09 grams of water would be added to 312.34 grams of emulsion polymer to start the paint making) As shown in Table 4, below, some compositions had an aminosilane (Silane A) added during formulation while others did not. The last step in paint making involves adding a mixture of water and 2 wt. % Cellosize™ ER-52M that sum to a specific total weight. The ratio of water to thickener solution is selected to provide a KU viscosity between 80-85. Compositions that did not have aminosilane added had slightly more water and/or thickener added to ensure the same total paint weight (1000 grams) whether silane was added or not.

TABLE 3

Coating Formulation

| Ingredient | Weight (g) |
|---|---|
| Part I | |
| Emulsion Polymer (50 wt. % solids) | 324.83 |
| Water | 3.59 |
| Rhodoline ™ 226/35 (Solvay) | 6.97 |
| Surfynol ™ CT-136 (Air Products) | 1.99 |
| Drewplus ™ L-493 (Ashland) | 3.91 |
| Ti-Pure ™ R-900 (Chemours) | 70.93 |
| Omyacarb ™ 5 (Omya) | 538.61 |
| Part II | |
| Methanol | 21.34 |
| Silane A | 1.62 or 0 |
| Texanol ™ (Eastman) | 16.13 |
| Water + 2 wt. % Cellosize ™ ER-52M solution in water | 10.07 with silane or 11.69 without |
| Total Weight = 1000 | |

The formulations in Table 3, above, were made with the emulsion polymers indicated in Table 4, below. Table 4 also shows the test results for the coatings made in the indicated Example.

In the examples of the present invention, the following test methods were used:

Dry-to-No-Pick-up Time Test:

A 350 micrometer thick layer of the indicated composition was applied over 10 cms×30 cms glass test panels. The test panels were then promptly placed in a test chamber (Victor Associates, Inc., Hatboro, Pa.) and maintained at a relative humidity of 90%±3%. The test chamber was equipped with a hygrometer and a temperature indicator, both of which were fastened to the center of the rear wall of the test chamber to ensure balanced measurement. The relative humidity of 90±3% prior to positioning of the test panels inside the test chamber was achieved by filling the pan at the bottom of the test chamber with 2 cms of water and then closing all the ports and doors and then allowing the test chamber to equilibrate overnight. After overnight equilibration, the relative humidity within the test chamber reached 100%. By carefully opening and closing the various ports, the relative humidity within the chamber was brought to 90±3%. The doors of the test chamber were opened briefly every few minutes to evaluate the No-Pick-up time for the traffic paint composition. The no pick-up time of the layer was determined in accordance with ASTM D711 (ASTM International, West Conshohocken, Pa., 2010), by rolling a traffic paint drying time wheel over the wet layer. The end point for no pick-up time is defined as the point in time where no paint adheres to the rubber rings of the test wheel.

Better no-pick-up time is lower, preferably less than 40 minutes at 90% relative humidity, preferably less than 30 minutes.

Dry-Through Time Test:

A 350 micrometer thick layer of the aqueous coating composition was applied over 10 cms×30 cms glass test panels. The test panels were then promptly placed in a test chamber (Victor Associates, Inc., Hatboro, Pa.) and maintained at a relative humidity of 90±3%. The test chamber was equipped with a hygrometer and a temperature indicator, both of which were fastened to the center of the rear wall of the test chamber to ensure balanced measurement. The relative humidity of 90±3% prior to positioning of the test panels inside the test chamber was achieved by filling the pan at the bottom of the test chamber with 2 cms of water and then closing all the ports and doors and then allowing the test chamber to equilibrate overnight. After overnight equilibration, the relative humidity within the test chamber reached 100%. By carefully opening and closing the various ports, the relative humidity within the chamber was brought to 90 percent±3 percent.

The doors of the test chamber were opened briefly every few minutes to evaluate the dry-through time for the layer of the traffic paint composition. The dry-through time is defined as the time it takes for the layer from its application to the panel until the time the layer is dry enough to be not distorted from a 90 degree thumb twist applied gently with minimal pressure on the layer.

Better dry-through time is lower, passing at 45 minutes at 90% relative humidity or, preferably, passing at 30 minutes Heat-Age Test:

One day after an indicated coating composition was made, 220 ml of the paint should be poured into a 235 ml can. The composition should have Stormer viscosity (KU) measured and recorded. The cans are sealed and the compositions are placed in an oven at 60° C. for 7 days. The cans should be well sealed to ensure that no volatile compounds are lost during the testing. After 7 days, the coating compositions were taken out of the oven and allowed to cool down for 24 hours prior to any measurements. The compositions were examined for syneresis and sedimentation, then they were mixed for few minutes. Stormer viscosity of the mixed compositions was then measured and recorded. The change in Stormer KU viscosity before and after the test should be less than 15 Krebs units for acceptable traffic paint performance, preferably less than 10 Krebs units. Any other observations such as gel appearance, syneresis, settling and flocculation can be recorded as a bad stability.

Mandrel Bend Test:

A 525 micrometer thick layer of the aqueous coating composition was applied over black plastic-vinyl chloride/acetate copolymer Scrub Charts (Leneta Corp., Mahwah, N.J.) as used in ASTM D2486 and ASTM D4213 (ASTM International, West Conshohocken, Pa., 2012). The test panels were then promptly placed in a controlled humidity room and maintained at a relative temperature of 23±3° C. with a relative humidity of 50±5%. After 24 hours the panels were moved to a low temperature room held at 2±1° C. with a relative humidity of 40±5%. Test panels were allowed to equilibrate two hours under these conditions prior to testing. A cylindrical mandrel bend test apparatus (conforming to ASTM D-522, (ASTM International, West Conshohocken, Pa., 2013) was placed in the low temperature room 24 hours prior to testing to allow equilibration. After the panels equilibrated each had mandrel bend flexibility tested at the low temperature conditions (2±1° C. with a relative humidity of 40±5%) according to ASTM D522. Each indicated coating formulation was tested with rods of 12.7 mm (½ inch), 6.4 mm (¼ inch) and 3.2 mm (⅛ inch) diameter and the smallest diameter rod that yielded a passing result was recorded (or "None" was recorded if all tests resulted in failure).

Smaller diameters correspond to better mandrel flexibility, with a preferred result of passing at 6.4 mm (¼ inch) at 2° C., even more preferably passing at 3.2 mm (⅛ inch).

TABLE 4

Coating Compositions and Performance

| Example | Emulsion Polymer | Amino Silane | Heat Age, Delta KU | 90% Dry No Pick Up (minutes) | 90% Dry Through (minutes) | Mandrel Bend (2° C.) |
|---|---|---|---|---|---|---|
| C-1A | C-1 | no | 7 | 8 | 15 | None |
| C-2A | C-2 | no | GEL | >45 | >45 | 3.2 |
| C-3A | C-3 | no | 23.2 | 44 | 45 | 6.4 |
| C-4A | C-4 | no | GEL | 44 | 45 | 12.7 |
| C-5A | C-5 | no | 5 | 16 | 30 | None |
| INV-A1 | INV-A | no | 6 | 28 | 30 | 3.2 |
| C-1B | C-1 | yes | 8 | 12 | 15 | None |
| C-2B | C-2 | yes | GEL | >45 | >45 | 3.2 |
| C-3B | C-3 | yes | GEL | >45 | >45 | 6.4 |
| C-4B | C-4 | yes | GEL | 12 | 15 | None |
| C-5B | C-5 | yes | 5 | 12 | 30 | None |
| C-6B | C-6 | yes | 7 | 16 | 30 | 12.7 |
| C-7B | C-7 | yes | 12 | >45 | >45 | 3.2 |
| C-8B | C-8 | yes | 13 | >45 | >45 | 3.2 |
| C-9B | C-9 | yes | 48 | >45 | >45 | 3.2 |
| INV-A2 | INV-A | yes | 5 | 12 | 15 | 3.2 |
| INV-B | INV-B | yes | 9 | 36 | 45 | 3.2 |

Comparative Compositions C-1A to C-4A, C-1B to C-4B and Inventive Compositions INV-A1 and INV-A2 comprise various emulsion polymers of similar calculated Tg values but with differing calculated Hansch parameter values. Inventive compositions INV-A1 and INV-A2 show a combination of good heat age stability, good drying time at high humidity and good cold flexibility. Comparative compositions C-1A and C-1B lack acceptable low temperature flexibility while comparative paints C-2A to C-4A and C-2B to C-4B all lack acceptable heat age stability and at least one other critical property (either dry time or flexibility).

Inventive compositions INV-A2 and INV-B and comparative compositions C-5A, C-5B, C-6B and C-7B comprise emulsion polymers of similar calculated Hansch parameter values and similar monomers but with differing calculated Tg values. Comparative paints C-5B and C-6B lack acceptable low temperature flexibility while comparative paint C-7B lacks acceptable high humidity dry time. Inventive paints INV-A2 and INV-B both show good performance on all four critical properties.

Comparative paints C-8B and C-9B demonstrate poor high humidity dry time from paints comprising binders that have both calculated Tg and calculated Hansch parameter values outside of the inventive range.

We claim:

1. An aqueous composition for use in traffic markings comprising (i) from 5 to 30 wt. % as solids, based on the total weight of the aqueous composition, of one or more vinyl or acrylic emulsion polymers chosen from single stage and multi-stage emulsion polymers, the polymer or at least one stage of the one or more multi-stage emulsion polymers having a calculated glass transition temperature (Tg) of from −25 to 0° C., and having a calculated Hansch parameter of from 1.4 to 2.25 (ii) one or more fillers, extenders and/or pigments, wherein the composition has a percent pigment volume concentration (% PVC) of from 40 to 80%, and an aminosilane.

2. The aqueous composition as claimed in claim 1, wherein the (i) one or more vinyl or acrylic emulsion polymer is an acrylic emulsion polymer.

3. The aqueous composition as claimed in claim 1, wherein the (i) one or more vinyl or acrylic emulsion polymer is an anionically stabilized emulsion polymer and, wherein the composition further comprises one or more polyamine and one or more volatile base wherein the composition has a pH of 8 to 11.

4. The aqueous composition as claimed in claim 1, wherein the (ii) one or more fillers, extenders and/or pigments comprises, a pigment combined with one or more fillers and/or extenders.

5. The aqueous composition as claimed in claim 1, wherein the (i) one or more vinyl or acrylic emulsion polymer contains, in copolymerized form, from 20 to 70 wt. %, based on the total weight of monomer solids used to make the polymer, of one or more monomers which have a Hansch parameter of from 1.0 to 1.4.

6. The aqueous composition as claimed in claim 1, wherein the (i) one or more vinyl or acrylic emulsion polymer contains, in copolymerized form, less than 10 wt. %, based on the total weight of monomer solids used to make the polymer, of one or more monomers which have a Hansch parameter of 3.5 or greater.

7. The aqueous composition as claimed in claim 1, wherein the (i) one or more vinyl or acrylic emulsion polymer contains, in copolymerized form, from 0 to 10 wt. %, based on the total weight of monomer solids used to make the polymer, of a monomer which has a Hansch parameter of less than 1.1.

8. A method of making a traffic marking or other coated substrate comprising applying the aqueous compositions as claimed in claim 1 to (a) a road, paved or concrete surface and allowing it to dry to form a traffic marking, or to (b) a concrete surface or a building surface and allowing it to dry to form a coated substrate.

9. The method according to claim 8 further comprising contacting said traffic paint with an absorber.

10. The composition as claimed in claim 1 wherein the polymer is a single stage polymer.

11. An aqueous composition for use in traffic markings comprising (i) from 5 to 30 wt. % as solids, based on the total weight of the aqueous composition, of one or more vinyl or acrylic emulsion polymers chosen from single stage and multi-stage emulsion polymers, the polymer or at least one stage of the one or more multi-stage emulsion polymers having a calculated glass transition temperature (Tg) of from −25 to 0° C., and having a calculated Hansch parameter of from 1.4 to 2.25 (ii) one or more fillers, extenders and/or pigments, wherein the composition has a percent pigment volume concentration (% PVC) of from 40 to 80%, and wherein the composition characterized in that a 350 micrometer coating of the composition has a dry-to-no-pick up time of less than 40 minutes at 90% relative humidity and/or a dry-though time of less than 45 minutes at 90% relative humidity.

12. The composition of claim 11 further characterized by one or more of:
    a 525 micrometer layer of the composition passes Mandrel bend at a diameter of 6.4 mm or less,
    the composition has a change in Stormer viscosity after aging at 60° C. for 6 days of less than 15 Krebs units.

13. The composition of claim 11 wherein the calculated glass transition temperature (Tg) is from −12 to 0° C.

14. The composition of claim 4 wherein the extender is calcium carbonate.

15. The composition of claim 1 further comprising a coalescent.

16. The composition of claim 11 further comprising an aminosilane.

* * * * *